United States Patent
Morimoto (10) Patent No.: US 9,538,399 B2
(45) Date of Patent: Jan. 3, 2017

(54) WIRELESS COMMUNICATION APPARATUS AND METHOD FOR CONTROLLING WIRELESS COMMUNICATION APPARATUS

(71) Applicant: Panasonic Intellectual Property Management Co., Ltd., Osaka-shi, Osaka (JP)

(72) Inventor: Shigeru Morimoto, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 35 days.

(21) Appl. No.: 14/416,242

(22) PCT Filed: Mar. 5, 2014

(86) PCT No.: PCT/JP2014/001202
§ 371 (c)(1),
(2) Date: Jan. 21, 2015

(87) PCT Pub. No.: WO2014/174748
PCT Pub. Date: Oct. 30, 2014

(65) Prior Publication Data
US 2015/0208252 A1    Jul. 23, 2015

(30) Foreign Application Priority Data
Apr. 25, 2013 (JP) ................................ 2013-092353

(51) Int. Cl.
*H04L 1/00* (2006.01)
*H04W 24/02* (2009.01)
(Continued)

(52) U.S. Cl.
CPC ........... *H04W 24/02* (2013.01); *H04B 7/0682* (2013.01); *H04B 7/084* (2013.01)

(58) Field of Classification Search
CPC ...... H04W 52/40; H04W 52/41; H04W 52/42; H04W 72/04; H04W 72/05; H04W 72/06; H04W 84/12; H04W 84/13; H04W 84/14; H04W 84/15; H04W 84/16
(Continued)

(56) References Cited

U.S. PATENT DOCUMENTS

| 6,763,062 B1 | 7/2004 | Kohno et al. |
| 7,266,356 B2* | 9/2007 | Sekine ................. H04B 7/0805 455/276.1 |
| 2003/0109282 A1* | 6/2003 | Shperling ................. H04L 1/02 455/561 |

FOREIGN PATENT DOCUMENTS

| JP | 05-300059 | 11/1993 |
| JP | 07-123038 | 5/1995 |

(Continued)

OTHER PUBLICATIONS

English Translation of International Search Report for PCT Patent Application Serial No. PCT/JP2014/001202 mailed Jun. 10, 2014, 1 page.

*Primary Examiner* — Dady Chery
(74) *Attorney, Agent, or Firm* — Brinks Gilson & Lione (57) ABSTRACT

A wireless communication apparatus includes: a first antenna; a second antenna; a variable phase shifting unit that changes a phase of a high frequency signal to be received or transmitted via the first antenna and the second antenna; and a phase-information table storage unit that stores a phase information table in which phase information is associated with each of a plurality of communication terminals as communication partners. When communicating with one communication terminal out of the plurality of communication terminals via the first antenna and the second antenna, the variable phase shifting unit changes a phase of a high frequency signal on the basis of phase information stored in (Continued)

the phase information table in association with the one communication terminal.

4 Claims, 7 Drawing Sheets

(51) Int. Cl.
 *H04B 7/06* (2006.01)
 *H04B 7/08* (2006.01)
(58) Field of Classification Search
 USPC .................................. 370/329, 330, 334–338
 See application file for complete search history.

(56) References Cited

FOREIGN PATENT DOCUMENTS

| | | |
|---|---|---|
| JP | 10-224281 | 8/1998 |
| JP | 2000-332666 A | 11/2000 |
| JP | 2006-266512 A | 10/2006 |
| JP | 2008-085944 A | 4/2008 |

* cited by examiner

| HOUSEHOLD ELECTRICAL APPLIANCE | PHASE INFORMATION |
|---|---|
| HOUSEHOLD ELECTRICAL APPLIANCE 1 | $\phi 1$ |
| HOUSEHOLD ELECTRICAL APPLIANCE 2 | $\phi 2$ |
| HOUSEHOLD ELECTRICAL APPLIANCE 3 | $\phi 3$ |
| HOUSEHOLD ELECTRICAL APPLIANCE 4 | $\phi 4$ |
| HOUSEHOLD ELECTRICAL APPLIANCE 5 | $\phi 5$ |

FIG. 2B

| HOUSEHOLD ELECTRICAL APPLIANCE | PHASE INFORMATION 1 | PHASE INFORMATION 2 | PHASE INFORMATION 3 |
|---|---|---|---|
| HOUSEHOLD ELECTRICAL APPLIANCE 1 | $\phi 11$ | $\phi 12$ | $\phi 13$ |
| HOUSEHOLD ELECTRICAL APPLIANCE 2 | $\phi 21$ | $\phi 21$ | $\phi 21$ |
| HOUSEHOLD ELECTRICAL APPLIANCE 3 | $\phi 31$ | $\phi 31$ | $\phi 31$ |
| HOUSEHOLD ELECTRICAL APPLIANCE 4 | $\phi 41$ | $\phi 41$ | $\phi 41$ |
| HOUSEHOLD ELECTRICAL APPLIANCE 5 | $\phi 51$ | $\phi 51$ | $\phi 51$ |

FIG. 2C

| HOUSEHOLD ELECTRICAL APPLIANCE | PHASE INFORMATION | PHASE DIFFERENCE INFORMATION |
|---|---|---|
| HOUSEHOLD ELECTRICAL APPLIANCE 1 | $\phi 1$ | $d\phi 1$ |
| HOUSEHOLD ELECTRICAL APPLIANCE 2 | $\phi 2$ | $d\phi 2$ |
| HOUSEHOLD ELECTRICAL APPLIANCE 3 | $\phi 3$ | $d\phi 3$ |
| HOUSEHOLD ELECTRICAL APPLIANCE 4 | $\phi 4$ | $d\phi 4$ |
| HOUSEHOLD ELECTRICAL APPLIANCE 5 | $\phi 5$ | $d\phi 5$ |

WIRELESS COMMUNICATION APPARATUS AND METHOD FOR CONTROLLING WIRELESS COMMUNICATION APPARATUS

This application is a 371 application of PCT/JP2014/001202 having an international filing date of Mar. 5, 2014, which claims priority to JP2013-092353 filed Apr. 25, 2013, the entire contents of which are incorporated herein by reference.

TECHNICAL FIELD

The present invention relates to a wireless communication apparatus that performs wireless communications by using electric waves. Particularly, the invention relates to communications between wireless communication apparatuses that are fixedly installed under the environment where electric wave propagation multipaths are present.

BACKGROUND ART

In recent years, the use of a wireless LAN operating at 2.4 GHz or 5 GHz has become more prevalent. Further, interest has been growing in, for example, a household electrical appliance home-network for performing mutual communications between household electrical appliances by using a small electric power wireless of a 400 MHz band or a 900 MHz band.

In the household electrical appliance home-network, household electrical appliances capable of performing wireless communications are relocated only a limited number of times. Further, in many cases, such household electrical appliances capable of performing wireless communications are installed in rooms having many communication obstacles, such as walls and floors are present. Because of these obstacles, a propagation path of the electric wave to be transmitted and received will be under the multipath environment, thereby constituting points at which the level of electric wave reception is reduced locally due to fading.

Figure 5:
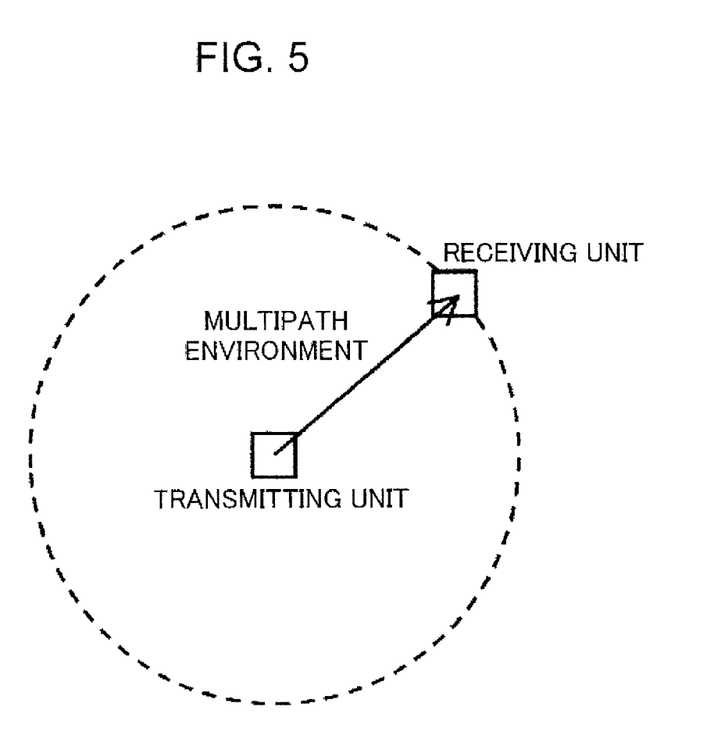
FIG. 5 is a schematic view showing a layout example of a transmitting unit that is set under a multipath environment, and a receiving unit that is set on the circumference of a circle at the same distance from the transmitting unit.
Figure 6:
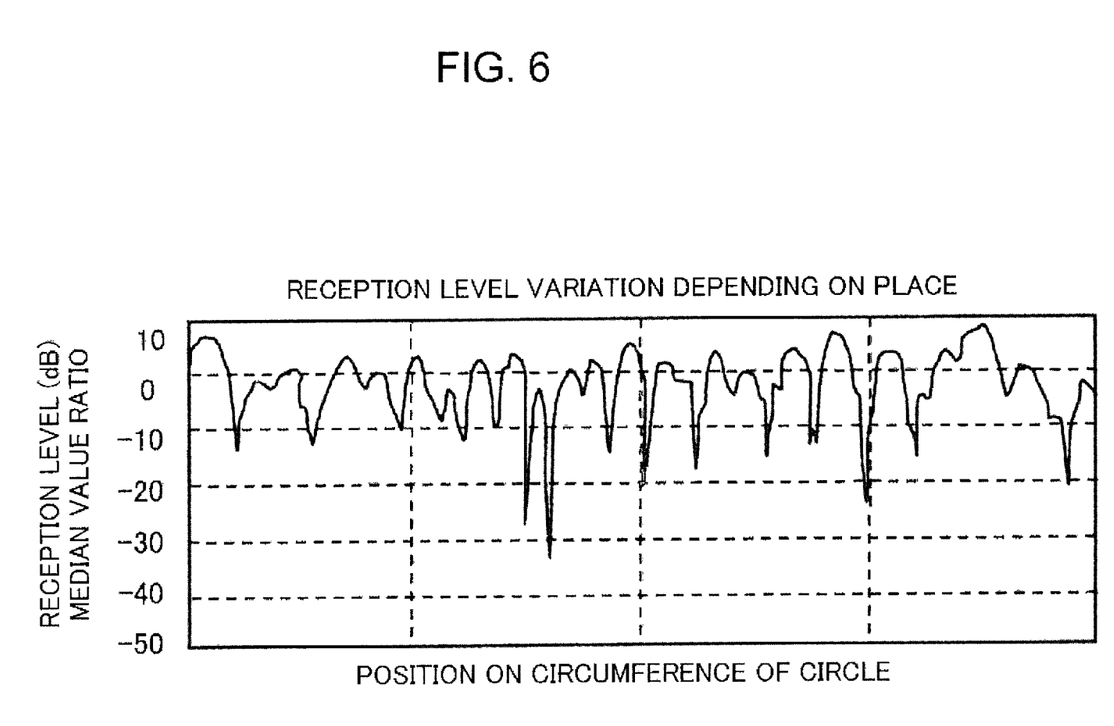
FIG. 6 shows an example of a result of measuring electric field intensities at a plurality of points on the circumference of a circle shown in FIG. 5.

More specifically, as shown in FIG. 5, as a result of checking the state of a variation in the reception level of an electric wave by measuring the electric field intensities at positions (on the circumference of a circle) of the same distance from a transmitting unit under the multipath environment, it is clear that the reception levels are greatly different depending on positions as shown in FIG. 6. This is because of the occurrence of what is called a fading phenomenon in which electric waves are offset or added together by the multipath. FIG. 6 is a schematic view showing a layout example of a transmitting unit that is set under the multipath environment, and a receiving unit that is set on the circumference of a circle at the same distance from the transmitting unit. Further, FIG. 6 shows an example of a result of measuring electric field intensities at a plurality of points on the circumference of a circle shown in FIG. 5. FIG. 6 shows a correspondence relationship between the points on the circumference of a circle that are expressed on the lateral axis, and reception levels of electric waves that are expressed on the vertical axis.

Figure 7:
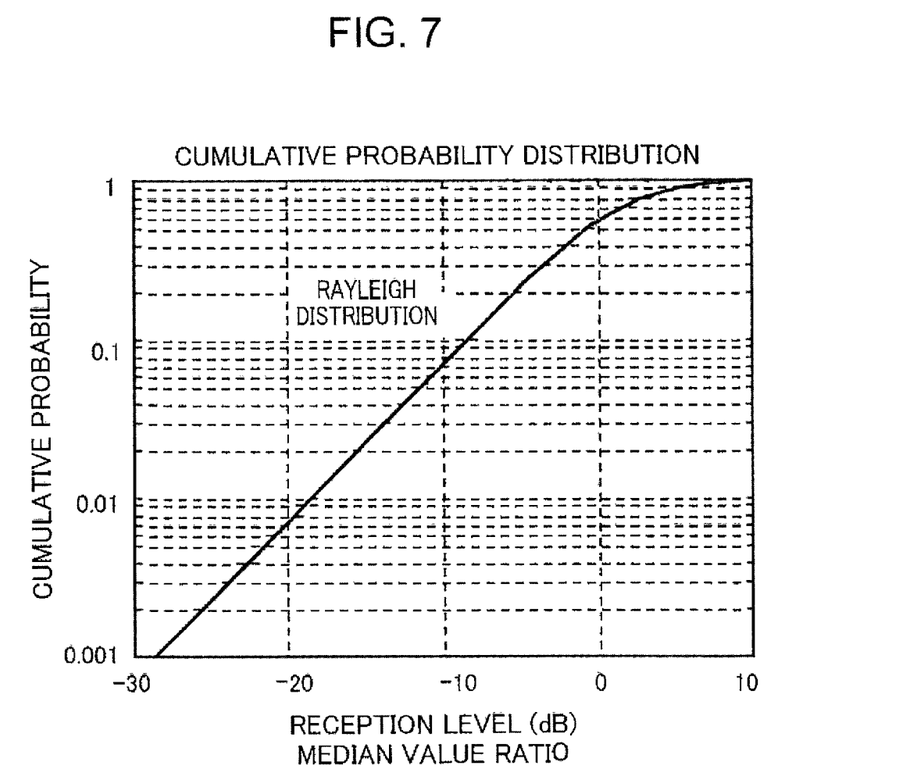
FIG. 7 is a probability distribution diagram showing an example of a relationship between a reception level and a probability that a wireless communication apparatus is present at the reception level.

As shown by the Rayleigh distribution in FIG. 7, the ratio for points, at which reception levels decrease by 8 dB or more from the median value of the reception levels, is 10%. Further, the ratio for points, at which reception levels decrease by 18 dB or more from the median value of the reception levels, is 1%. FIG. 7 is a probability distribution diagram showing an example of a relationship between a reception level and a probability that a wireless communication apparatus is present at the reception level. FIG. 7 is provided on the supposition that the reception level of the electric wave follows the Rayleigh distribution, assuming a state where attenuation of the electric wave is large due to the reflection by walls and the like.

In the case of a wireless terminal such as a mobile telephone that is used by being carried about, a communication environment changes following a movement, and therefore, there is a low possibility that the reception level stays at a locally declined reception level point for a long time. However, in the case of a wireless terminal that does not assume a movement such as a household electrical appliance that can perform wireless communications, a state of the declined reception level continues for a long time in some cases because of lack in the change in the communication environment.

In order to cope with such a state, there has been considered an attempt to improve qualities and reliability of communications by a selection diversity system that includes a plurality of antennas and preferentially uses a signal of an antenna which is in an excellent electric wave state among the same wireless signals that have been received by the plurality of antennas.

A plurality of antennas are used in the selection diversity system, but in the system since only one of the plurality of antennas is used after the selection of the antenna, antenna gain is no different from that of the configuration that does not employ this selection diversity system. Further, there may be a case at high probability where some of the plurality of antennas exhibit declined reception levels simultaneously, hence in some case the occurrence of declined levels cannot be sufficiently evaded.

Therefore, in order to evade the state of the declined reception level by improving the antenna gain, there has been a proposal to solve this problem by a maximum ratio combining diversity system that removes (reduces) noise by combining the same wireless signals that have been received by the plurality of antennas (refer to Patent Literature 1, for example).

That is, the combining circuit disclosed in Patent Literature 1 is configured to include a plurality of reception-wave weighting means corresponding to antennas, that perform weighting to input reception waves by the amplitude of the input reception wave and the inverse number of noise power, and a combining processing unit that combines the outputs of the reception-wave weighting means. Based on this configuration, even when noise power of each reception wave is different, a signal-to-noise power ratio (SNR, S/N ratio) of each combining reception wave can be maximized.

On the other hand, as a more simple method, there has been a proposal, by providing a plurality of antenna elements and a variable phase shifting unit, to perform communications by suitably correcting a phase shift quantity in the phase shifting unit that combines received reception signals based on so that the phase in the wave combining unit becomes a predetermined phase (refer to Patent Literature 2, for example). That is, a state of the declined reception level is avoided by performing communications when the phase shifting unit is set to a phase shift quantity at which the level of the combined wave is largest.

However, the conventional technique as disclosed in Patent Literature 1 has a problem in that a circuit configuration becomes large. More specifically, the combining circuit disclosed in Patent Literature 1 is configured to include a receiving circuit and a demodulation processing circuit for each antenna (for example, an envelope line estimating unit, a residual power estimating unit, a residual power calculating unit, a complex multiplying unit, a multiplying unit, and a combining unit). Particularly, a wireless communication apparatus that is incorporated in the household electrical appliance and like is required to have a miniaturized size, a simplified circuit configuration, and reduce electric power consumption. As in the conventional art, if the number of the receiving circuits and demodulation circuits to be provided in the configuration has to be predicated on the number of antennas, it is difficult to achieve miniaturization.

The conventional technique as disclosed in Patent Literature 2 has a problem in that the setting of a variable phase shifting unit needs to be searched for each time communications are performed with a different household electrical appliance in a situation where communication is performed among a plurality of household electrical appliances, and also has a problem in that certain time is required until reception is implemented.

CITATION LIST

Patent Literature

Patent Literature 1: Japanese Unexamined Patent Publication No. H10-224281
Patent Literature 2: Japanese Unexamined Patent Publication No. 2008-085944

SUMMARY OF INVENTION

The present invention has been made in view of the above problems, and an object of the invention is to realize simplification of a circuit configuration and low electric-power consumption while achieving miniaturization by preventing increase in a device configuration, when performing wireless communications in order to control a plurality of household electrical appliances of which a wireless communication apparatus is fixed in the room, and realize performing stable communications.

A wireless communication apparatus according to one aspect of the present invention includes: a first antenna; a second antenna; a variable phase shifting unit that changes a phase of a high frequency signal to be received or transmitted via the first antenna and the second antenna; and a storage unit that stores a phase information table in which phase information is associated with each of a plurality of communication terminals as communication partners, wherein when communicating with one communication terminal out of the plurality of communication terminals via the first antenna and the second antenna, the variable phase shifting unit changes a phase of a high frequency signal on the basis of phase information stored in the phase information table in association with the one communication terminal.

According to the present invention, there is an effect that stable communications can be performed under a multipath environment.

DETAILED DESCRIPTION OF THE PREFERRED EMBODIMENTS

A wireless communication apparatus according to one aspect of the present invention includes: a first antenna; a second antenna; a variable phase shifting unit that changes a phase of a high frequency signal to be received or transmitted via the first antenna and the second antenna; and a storage unit that stores a phase information table in which phase information is associated with each of a plurality of communication terminals as communication partners, wherein when communicating with one communication terminal out of the plurality of communication terminals via the first antenna and the second antenna, the variable phase shifting unit changes a phase of a high frequency signal on the basis of phase information stored in the phase information table in association with the one communication terminal.

Accordingly, there is provided a configuration for stably performing communications under a multipath environment.

Further, in the wireless communication apparatus, preferably, the phase information table has information on a plurality of phase values for each of the communication terminals.

Accordingly, there is provided a configuration for stably performing communications even when the multipath environment has changed.

Further, in the wireless communication apparatus, preferably, the phase information table has information on a phase change width corresponding to each of the communication terminals.

Accordingly, there is provided a configuration for stably performing communications by a small phase-information table even when the multipath environment has changed.

A method for controlling a wireless communication apparatus according to another aspect of the present invention is a control method of a wireless communication apparatus having: a first antenna; a second antenna; a variable phase shifting unit that changes a phase of a high frequency signal to be received or transmitted via the first antenna and the second antenna; a storage unit that stores a phase information table in which phase information is associated with each of a plurality of communication terminals as communication partners; and a control unit that changes a phase of the variable phase shifting unit, the method including the steps of: changing a phase of the variable phase shifting unit whenever receiving a predetermined signal transmitted by the communication terminal; storing a phase which has been changed by the variable phase shifting unit at the time of receiving the predetermined signal, and reception levels of the signal; and storing into the phase information table, phase information that expresses a phase which has been changed by the variable phase shifting unit at the time when the highest reception level is exhibited from among the stored reception levels.

According to this, stable communications can be performed under a multipath environment.

Hereinafter, an embodiment of the present invention will be described with reference to the drawings. The present invention is not limited by the embodiment.

Embodiment 1

Figure 1:
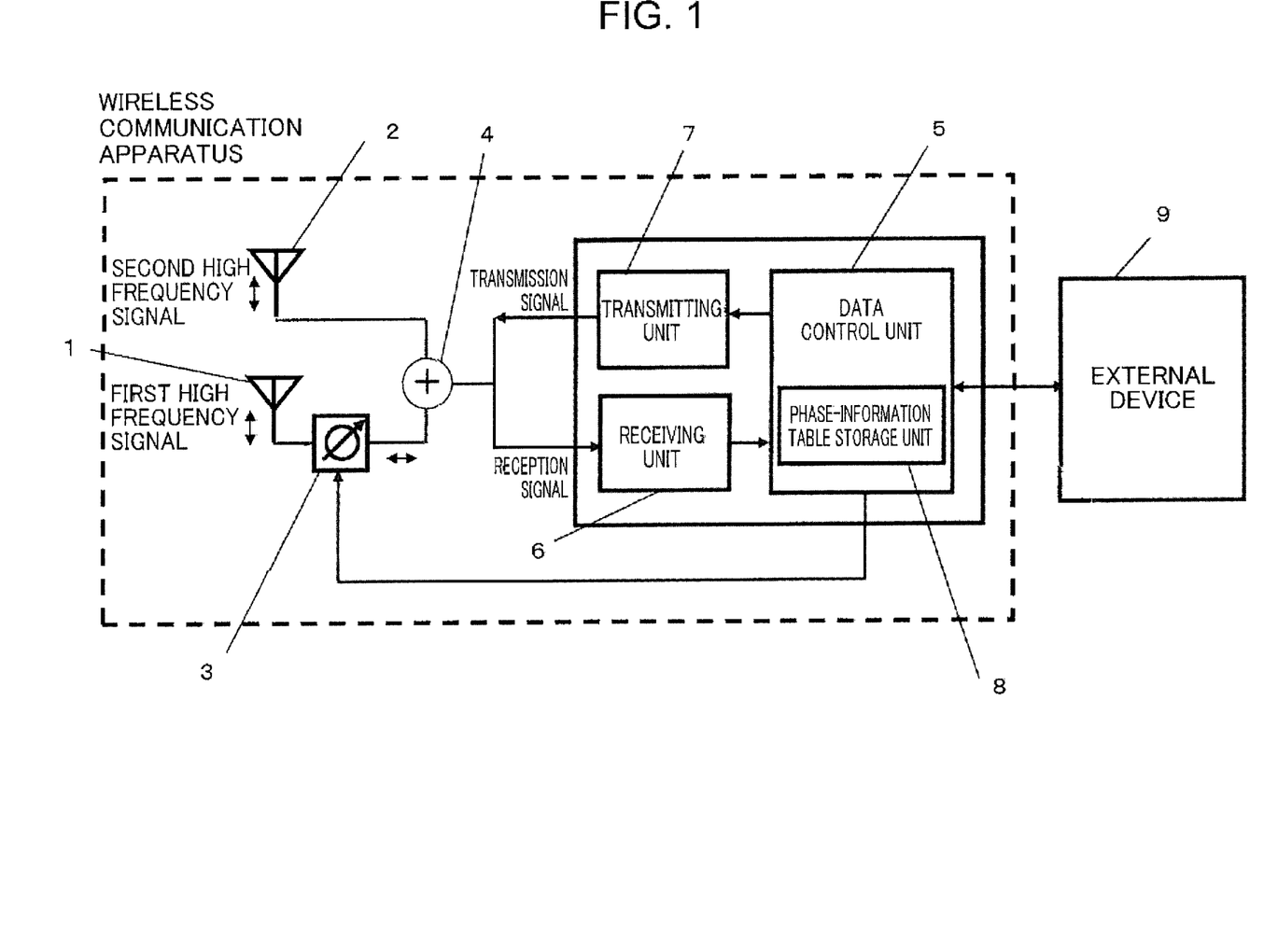
FIG. 1 is a block diagram showing an example of a schematic configuration of a wireless communication apparatus according to an embodiment.

FIG. 1 is a block diagram showing an example of a configuration of a wireless communication apparatus according to Embodiment 1. As shown in FIG. 1, the wireless communication apparatus includes a first antenna 1, a second antenna 2, a variable phase shifting unit 3, a combining unit 4, a data control unit 5, a transmitting unit 7, and a receiving unit 6. In a reception state, a high frequency signal that has been received by the first antenna 1 is input to the variable phase shifting unit 3, and the high frequency signal from the variable phase shifting unit 3 is input to the combining unit 4 as a first high frequency signal.

The high frequency signal that has been received by the second antenna 2 is input to the combining unit 4 as a second high frequency signal. Then, the combining unit 4 adds and combines the first high frequency signal and the second high frequency signal, and inputs a result of the addition and combining to the receiving unit 6 as a reception signal.

The receiving unit 6 generates demodulated data by demodulating the reception signal, calculates a reception electric power level, and transmits the demodulated data and the reception electric power level to the data control unit 5. The data control unit 5 transmits the demodulated data from the receiving unit 6, to an external device 9, and receives transmission data from the external device 9.

In a transmission state, the data control unit 5 transmits transmission data to the transmitting unit 7, and the transmitting unit 7 generates modulated data. The transmitting unit 7 outputs the generated demodulated data to the combining unit 4, oppositely to the reception state, and outputs a high frequency signal from the first antenna 1 and the second antenna 2.

The data control unit 5 has a function of reading phase information from a phase-information table storage unit 8, and adjusting a setting value of the variable phase shifting unit 3 so that a phase of a high frequency signal that passes through the variable phase shifting unit 3 is at a value of the phase information that has been read from the phase-information table storage unit 8. The phase information on the variable phase shifting unit 3 that is stored in the phase information table includes extracted conditions that are proper for communicating with respective household electrical appliances under the environment of presence of a multipath.

Figure 2A:
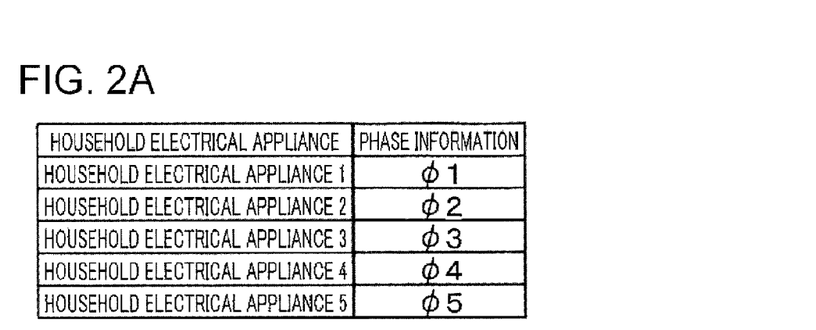
FIG. 2A shows an example of a phase information table that is included in the wireless communication apparatus according to the embodiment.

FIG. 2A shows an example of a phase information table that is stored in the phase-information table storage unit 8, and shows a phase information table of a wireless communication apparatus that communicates with five household electrical appliances. The phase information table has phase information corresponding to each household electrical appliance (household electrical appliances 1 to 5). In the case of communicating with the household electrical appliance 1, for example, phase information φ1 corresponding to the household electrical appliance 1 of the phase information table is read and the setting value of the variable phase shifting unit 3 is set to a value corresponding to the phase information φ1 in advance, so that the wireless communication apparatus can keep a satisfactory communication state with the household electrical appliance 1.

Figure 3:
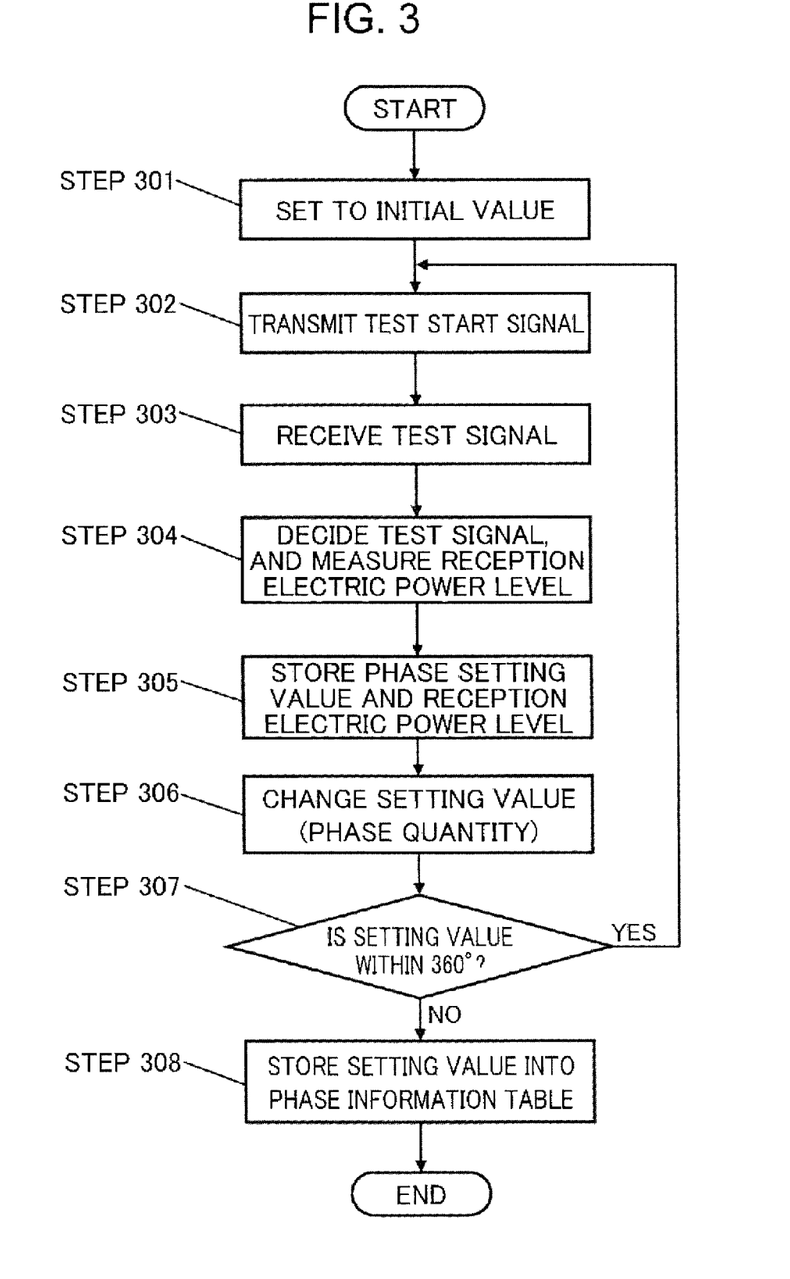
FIG. 3 shows an example of an acquisition flow of a phase information table according to the embodiment.

The phase information table is obtained in the flow shown in FIG. 3. First, the data control unit 5 sets the phase of the variable phase shifting unit 3 to an initial value (Step 301). The initial value is set to 0°. Then, the wireless communication apparatus transmits a test start signal destined to a household electrical appliance n (n=any one of 1 to 5), to the household electrical appliance n (Step 302).

The household electrical appliance n that has received the test start signal transmits a test signal to the wireless communication apparatus, and the wireless communication apparatus receives the test signal (Step 303). The receiving unit 6 receives the test signal, determines whether the test signal is a noise or not by a synchronization header of the test signal, and also measures a reception electric power level (Step 304).

Figure 4:
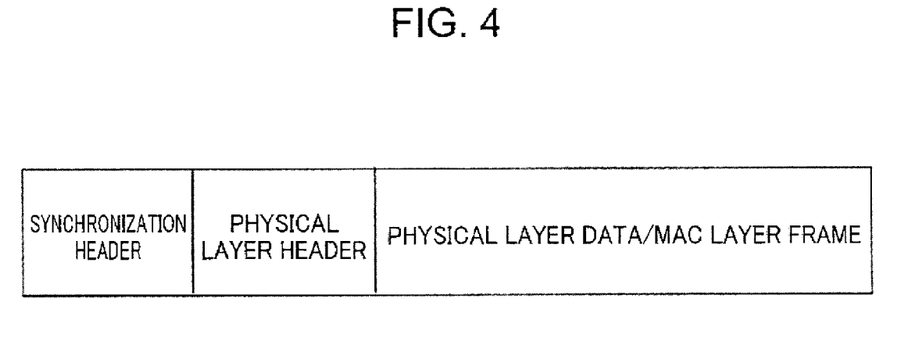
FIG. 4 shows an example of a test signal according to the embodiment.

A configuration of the test signal is as shown in FIG. 4. The test signal is configured by a synchronization header, a physical layer header, and a physical layer data/MAC frame. The data control unit 5 stores the value of the setting value that has been set in the variable phase shifting unit 3, and the reception electric power level that has been measured in Step 304, into the memory (not shown) (Step 305). When the receiving unit 6 has not been able to determine whether the test signal is a noise without being able to detect the synchronization header of the test signal in Step 304, the data control unit 5 transmits the reception electric power level to the data control unit 5 by setting the reception electric power level to zero.

Next, the data control unit 5 changes the setting value of the variable phase shifting unit 3 by a constant quantity (Step 306), and decides whether the setting value of the variable phase shifting unit 3 exceeds 360° (Step 307). During a period when the setting value does not exceed 360° (Yes in Step 307), the data control unit 5 executes Step 302.

When the setting value of the variable phase shifting unit 3 exceeds 360° (No in Step 307), the data control unit 5 stores into the phase information table, the setting value of the variable phase shifting unit 3 at the time of the highest reception level among the reception electric power levels that have been stored in the memory (Step 308). With this arrangement, the most satisfactory phase condition between the wireless communication apparatus and the household electrical appliance n can be extracted. By executing Step 301 to Step 308 to all the household electrical appliances (all n), the phase information table of FIG. 2A can be obtained.

Figure 2B:
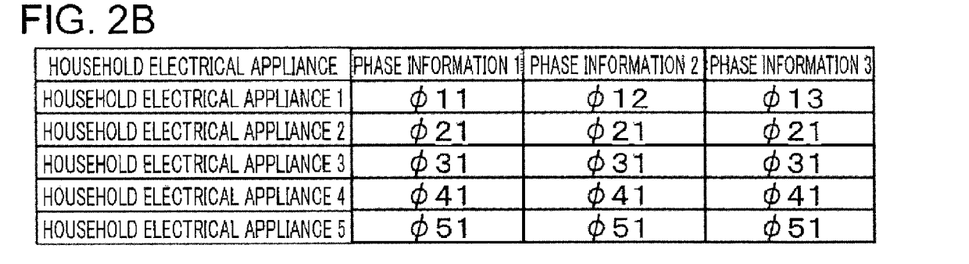
FIG. 2B shows another example of a phase information table that is included in the wireless communication apparatus according to the embodiment.
Figure 2C:
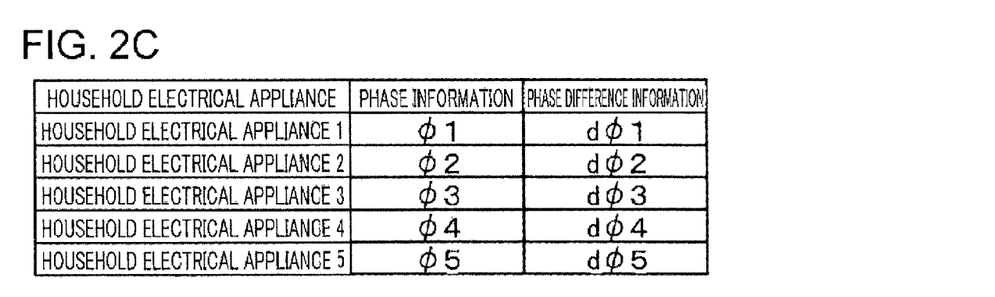
FIG. 2C shows yet another example of a phase information table that is included in the wireless communication apparatus according to the embodiment.

As shown in FIG. 2B or FIG. 2C, it is also effective to have a plurality of candidates of phase information to each household electrical appliance. FIG. 2B can be prepared by also storing the setting values of the variable phase shifting unit 3 at the time of second (phase information 2) and third (phase information 3) highest reception levels, not only by storing the setting value (phase information 1) of the variable phase shifting unit 3 at the time of the highest reception level in Step 308 in FIG. 3. Due to the change under the environment at the actual application time, there is a case where the reception probability becomes higher by setting the variable phase shifting unit 3 based on the phase information on the second (φ12 in the household electrical appliance 1) or third (φ13 in the household electrical appliance 1) highest reception level. In such a case, in the actual communications, in the household electrical appliance 1, first, the communications are started under the phase condition φ11 in which the reception level is the highest. In the case of performing a retransmission due to the occurrence of a communication error (for example, when a reception confirmation signal has not reached from the household electrical appliance as the transmitting destination), communications are performed under the phase condition φ12. When a communication error further occurs despite the retransmission, communications are performed under the phase condition φ13.

On the other hand, FIG. 2C does not have the phase information 2 and the phase information 3 in absolute values like in FIG. 2B, but has a configuration that has the phase information 2 and the phase information 3 in relative values. Phase difference information in FIG. 2C is a value obtained by subtracting the phase information 1 from the phase information 2 in FIG. 2B, for example (for example, in the household electrical appliance 1, dφ1=φ12−φ11). In the case of communicating by changing the phase condition at a retransmission time due to a communication error, the variable phase shifting unit 3 is changed by integer times of dφ1, for example. By controlling in this way, the phase-information table storage unit 8 is not required to store much phase information, and the memory can be saved. Further, based on the characteristics of the antenna, when proper phase-difference information is known in advance, phase difference information is not required to be obtained again. For example, it is useful to set the phase difference information as information that is equivalent to the phase of the variable phase shifting unit 3 which is changed by 45 degrees.

The variable phase shifting unit 3 may be provided in both the first antenna and the second antenna, not only in one of the first antenna and the second antenna. In this case, the phase-information table storage unit 8 has a phase information table corresponding to both variable phase shifting units, and the setting value of each phase information table is extracted following the steps in FIG. 3.

By providing a timer (not shown) in the wireless transmission apparatus, the data control unit 5 is allowed to periodically obtain the phase information table from the phase-information table storage unit 8. For example, at night when a person is not acting in the room, the electric wave propagation environment is stable and phase information can be obtained. Therefore, the processing shown in FIG. 3 is performed every night (at 1:00 AM, for example), and the phase information table is obtained or updated. Updating the phase information table once a day can save energy and is effective as compared with updating frequently. Because the electric wave propagation environment is different between daytime and night-time, proper information tables can be set and communications can be performed stably according to more individual electric wave propagation environments, by obtaining phase information tables which are different between the daytime and the night-time, and by operating a phase information table corresponding to each time zone in each time zone.

INDUSTRIAL APPLICABILITY

The wireless communication apparatus according to the present invention can be provided in a compact and simple configuration and perform stable communications while avoiding a declined local reception level caused by fading under the multipath propagation environment. Therefore, the wireless communication apparatus according to the present invention is useful for a wireless communication apparatus that is fixedly set under the multipath propagation environment.

The invention claimed is:

1. A wireless communication apparatus configured to communicate with a plurality of fixedly-installed communication terminals, the apparatus comprising:
   a first antenna;
   a second antenna;
   a variable phase shifting unit that changes a phase of a high frequency signal to be received or transmitted via the first antenna; and
   a combining unit that combines or distributes a high frequency signal having passed through the variable phase shifting unit and a high frequency signal to be received or transmitted via the second antenna;
   a storage unit that stores a phase information table in which phase information is associated with each of the plurality of communication terminals as communication partners, the phase information corresponding to maximum reception electrical power levels obtained from a combining characteristic of the combining unit,
   wherein when communicating with one communication terminal out of the plurality of communication terminals via the first antenna and the second antenna, the variable phase shifting unit changes a phase of a high frequency signal on the basis of phase information stored in the phase information table in association with the one communication terminal.

2. The wireless communication apparatus according to claim 1, wherein the phase information table has information on a plurality of phase values for each of the communication terminals.

3. The wireless communication apparatus according to claim 1, wherein the phase information table has information on a phase change width corresponding to each of the communication terminals.

4. A method for controlling a wireless communication apparatus configured to communicate with a plurality of fixedly-installed communication terminals, the apparatus having:
   a first antenna;
   a second antenna;
   a variable phase shifting unit that changes a phase of a high frequency signal to be received or transmitted via the first antenna;
   a combining unit that combines or distributes a high frequency signal having passed through the variable phase shifting unit and a high frequency signal to be received or transmitted via the second antenna;
   a storage unit that stores a phase information table in which phase information is associated with each of a plurality of communication terminals as communication partners; and
   a control unit that changes a phase of the variable phase shifting unit,
   the method comprising the steps of:
   changing a phase of the variable phase shifting unit whenever receiving a predetermined signal transmitted by one of the plurality of communication terminals;
   storing a phase which has been changed by the variable phase shifting unit at a time of receiving the predetermined signal, and reception levels of the signal; and
   storing into the phase information table, phase information that expresses a phase which has been changed by the variable phase shifting unit at a time when a highest reception level is exhibited from among the stored reception levels, the phase information obtained from a combining characteristic of the combining unit.

* * * * *